United States Patent
Spiess et al.

(10) Patent No.: US 7,173,800 B2
(45) Date of Patent: Feb. 6, 2007

(54) TIME-OPTIMUM RECEPTION OF PROTECTION COMMANDS IN A REMOTE TRIPPING DEVICE

(75) Inventors: Hermann Spiess, Habsburg (CH); Hans Benninger, Ennetturgi (CH)

(73) Assignee: ABB Schweiz AG, Baden (CH)

( * ) Notice: Subject to any disclaimer, the term of this patent is extended or adjusted under 35 U.S.C. 154(b) by 197 days.

(21) Appl. No.: 10/358,250

(22) Filed: Feb. 5, 2003

(65) Prior Publication Data
US 2003/0151866 A1    Aug. 14, 2003

(30) Foreign Application Priority Data
Feb. 14, 2002  (EP)  ................................. 02405116

(51) Int. Cl.
*H02H 3/00*   (2006.01)
(52) U.S. Cl. .......................................... 361/62; 361/64
(58) Field of Classification Search ................ 361/62, 361/63, 64, 65, 66, 67–69, 117, 118, 119; 375/211
See application file for complete search history.

(56) References Cited

U.S. PATENT DOCUMENTS

| | | | | |
|---|---|---|---|---|
| 3,626,297 A | | 12/1971 | Green et al. | |
| 3,643,160 A | | 2/1972 | Ray et al. | |
| 4,297,738 A | * | 10/1981 | Lee | ............................... 361/42 |
| 4,313,146 A | * | 1/1982 | Lee | ............................... 361/85 |
| 4,637,247 A | * | 1/1987 | Dreyer et al. | ............... 73/35.03 |
| 4,951,219 A | * | 8/1990 | Zimmer | ........................ 702/75 |

OTHER PUBLICATIONS

"NSD70—a new family of programmable, digital protection signalling equipment", ABB Review, No. 6, 1992, Zurich, Switzerland, pp. 3-10.
Fischer, D. and Madge, R., "Digital Teleprotection Units. A Technology Overview", IEEE Transactions on Power Delivery, No. 4, Oct. 1992, New York, USA, pp. 1769-1774.
Van Trees, Harry, Detection, Estimation, and Modulation Theory, Sec. 4.2 and 4.2.1, John Wiley & Sons, Inc., 1968, New York, USA.

* cited by examiner

*Primary Examiner*—Brian Sircus
*Assistant Examiner*—Danny Nguyen
(74) *Attorney, Agent, or Firm*—Buchanan Ingersoll & Rooney PC

(57) ABSTRACT

In a method and a detector (7) for time-optimum reception of protection commands in a remote tripping device, at least two detector elements (1, 2) are operated, which are all designed for a signal at the same frequency but for different transmission times. Where at least one of these detector elements (1, 2) detects the presence of the signal, the signal is regarded as having been detected.

4 Claims, 2 Drawing Sheets

TIME-OPTIMUM RECEPTION OF PROTECTION COMMANDS IN A REMOTE TRIPPING DEVICE

FIELD OF THE INVENTION

The invention relates to the field of protection technology for high-voltage and medium-voltage networks. It relates to a method for time-optimum reception of protection commands in a remote tripping device, and to a remote tripping device as claimed in the precharacterizing clause of patent claims 1 and 3.

BACKGROUND OF THE INVENTION

Remote tripping devices or protection signal transmission devices are used for transmitting protection or switching commands for distance protection in electrical high-voltage and medium-voltage networks and systems. Protection commands result, for example, in a circuit breaker being opened directly or indirectly and, in consequence, in electrical disconnection of a part of the network or of the system. Conversely, other protection commands result in opening of a circuit breaker being prevented. Protection commands must be transmitted, for example, from one section of a high-voltage line to another. To do this, a transmitter in a remote tripping device produces analog signals in accordance with the protection commands, which analog signals are transmitted via a signal link. A receiver in another remote tripping device detects the transmitted signals and determines the corresponding number and nature of the protection commands.

By way of example, the analog signals are in a frequency band between 0.3 and 4 kHz. They are either transmitted directly in this frequency band, or are modulated onto a carrier frequency and are demodulated upstream of the receiver, or are transmitted via a digital channel and are reconstructed upstream of the receiver. In any case, an analog received signal is produced at the receiver, in which the presence of individual signals at a different frequency must be detected.

By way of example, FIG. 1 shows a quiescent signal and a number of command signals in the frequency domain and in the time domain for transmission of command signals A, B, C, which correspond to transmitted protection commands or combinations of protection signals. An amplitude axis in the illustration is annotated Amp, a frequency axis is annotated f, and a time axis is annotated t. The transmitted signals are preferably sinusoidal and are each separated in frequency from one another by, for example, 100 Hz to 300 Hz. In a quiescent situation, that is to say when no protection command need be transmitted, a quiescent signal or guard signal G is transmitted continuously instead of this. When a command occurs between the times t1 and t2, one or more command signals are transmitted, and, by way of example, FIG. 1 shows the transmission of signals at two frequencies in the right-hand coordinate system. The receiver detects the presence or the lack of the command signals and of the quiescent signal G continuously, and produces an alarm signal if the signal quality is inadequate, if the two are received together or if no signal whatsoever is received.

The quiescent signal G is used to improve the safety and/or security in that it indicates that no command signal A, B, C is present. A command signal is regarded as having been received only when the quiescent signal G is no longer detected.

It is thus necessary to detect the presence or the lack of individual periodic signals. In this case, it should be borne in mind that the transmission is in general influenced by disturbances which can be characterized by a signal-to-noise ratio, that is to say a ratio SNR between the signal power and the disturbance power. Depending on the nature of the protection command, detection is subject to different requirements in this case, which can be characterized, inter alia, by the following parameters:

Puc Safety and/or security value, that is to say the probability that a command is received falsely, even though it has not actually been transmitted. A low Puc value corresponds to high transmission safety and/or security.

Pmc Reliability value, that is to say the probability that a command which has been transmitted is not received. A low Pmc value corresponds to high transmission reliability.

$T_{ac}$ maximum actual transmission time. This is dependent on the required reliability and on the signal-to-noise ratio SNR, and will be defined in more detail further below.

All known transmission and detection methods have the common feature that, as the disturbance power increases, that is to say the SNR decreases, the safety and/or security decrease and then, in some cases, increase once again, that is to say the safety and/or security value Puc increases and then, in some cases, decreases again, and the reliability decreases continuously, that is to say the reliability value Pmc increases continuously.

A signal at a specific frequency is detected, for example, by means of numerical correlation of the received sum signal with a comparison signal at the same frequency, or by bandpass filtering of the received sum signal. A preprocessed output value from the correlation or from the bandpass filter is compared with a threshold value. If the preprocessed output value is greater than the threshold value, then the signal is regarded as having been detected. The major parameters for the detection process are thus a correlation duration of a correlator or an inverse of the bandwidth of a bandpass filter which are referred to in combined form in the following text as the time constant or transmission time of the detection, as well as the magnitude of the threshold value.

A detector with a given time constant has the relationship shown in FIG. 2 between the signal-to-noise ratio SNR and the maximum actual transmission time $T_{ac}$ for a given reliability. By way of example, let us assume that a reliability value Pmc of 1% is required. For a given signal-to-noise ratio, that time period after the transmission of a signal is determined in which 99% of all the transmitted signals are detected in the receiver. The time period determined experimentally or theoretically in this way is the maximum actual transmission time $T_{ac}$. The curve illustrated in FIG. 2 is obtained for a number of values of the signal-to-noise ratio SNR. Typically, the transmission time T0 for which the detector was designed is located in the region of a bend in the curve; if the signal-to-noise ratio is high, the maximum actual transmission time $T_{ac}$ does not fall significantly below T0 and, as the signal-to-noise ratio decreases, it rises very rapidly. The possibility of still receiving a command of restricted duration after T0 has elapsed is comparatively small.

If the signal-to-noise ratio is known, the time constant of the detector is made as short as possible while still allowing the required reliability to be achieved. However, if the signal-to-noise ratio is not known and it can vary over a wide range, then optimum detection is impossible. Either the transmission time is too long or the reliability is inadequate as a result of this.

SUMMARY OF THE INVENTION

The object of the invention is therefore to provide a method for time-optimum reception of protection commands in a remote tripping device, and a remote tripping device of the type mentioned initially, which is less dependent on the signal-to-noise ratio of received signals.

This object is achieved by a method for time-optimum reception of protection commands in a remote tripping device, and by a remote tripping device having the features of patent claims 1 and 3.

In the method according to the invention for time-optimum reception of protection commands in a remote tripping device, at least two detector elements are thus operated, which are all designed for a signal at the same frequency but for different transmission times, and the signal is regarded as having been detected when at least one of these detector elements detects the presence of the signal.

The remote tripping device according to the invention has at least two detector elements, which are all designed for a signal at the same frequency but for different transmission times, and has a non-exclusive OR logic link between the outputs of the at least two detector elements in order to form an output of the detector.

It has been found that, as a function of the actually occurring signal-to-noise ratio at any given time, one of the detector elements in each case has a shorter transmission time than the other detector element or elements, so that the OR logic linking of the outputs of the detector elements results in the transmission time of the detector being equal to the transmission time of the respectively fastest detector element. In consequence, the transmission time is much less dependent on the signal-to-noise ratio than when using only a single detector element.

In one preferred embodiment of the invention, the at least two detector elements all have at least approximately the same safety and/or security level. In consequence, the safety and/or security level of the detector is also matched as well as possible to the requirement for command transmission.

Further preferred embodiments can be found in the dependent patent claims.

BRIEF DESCRIPTION OF THE DRAWINGS

The subject matter of the invention will be explained in more detail in the following text with reference to a preferred exemplary embodiment, which is illustrated in the attached drawings, in which.

The reference symbols used in the drawings and their meanings are listed in summary form in the list of reference symbols. In principle, identical parts are provided with the same reference symbols in the figures.

DETAILED DESCRIPTION OF THE INVENTION

Figure 1:
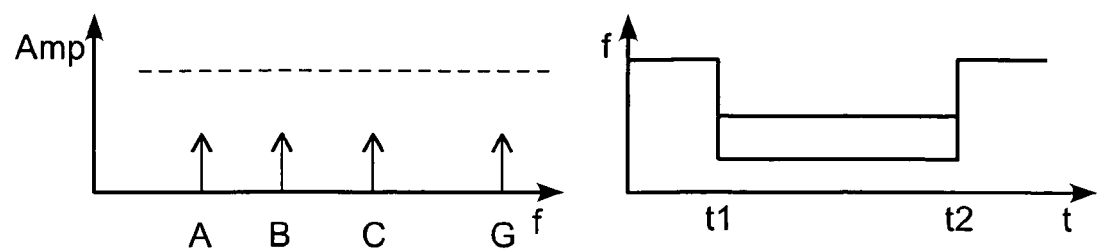
FIG. 1 shows, schematically, a profile of protection signals in the frequency domain and in the time domain.
Figure 2:
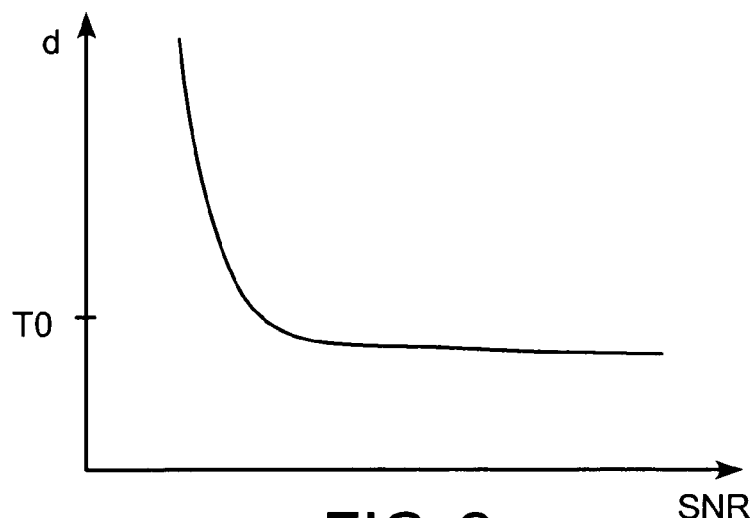
FIG. 2 shows the relationship between the signal-to-noise ratio and the maximum actual transmission time for a single detector.
Figure 3:
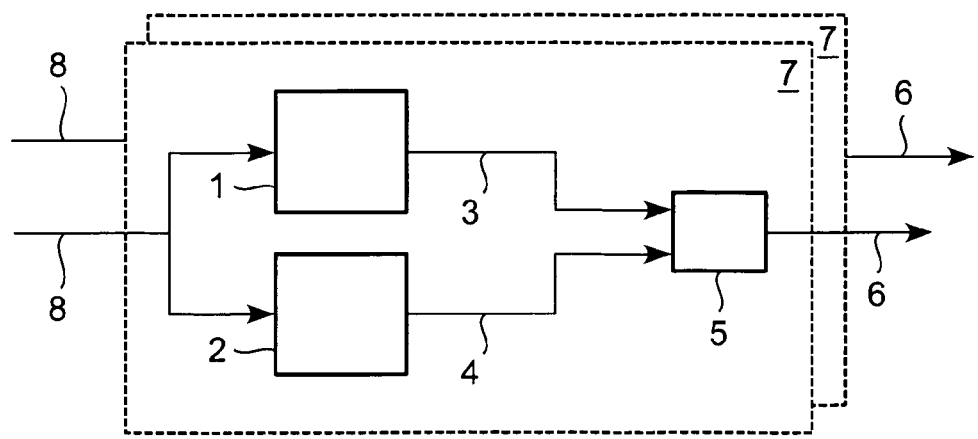
FIG. 3 shows, schematically, the structure of a detector according to the invention.

FIG. 3 shows, schematically, the structure of a detector according to the invention. The structure may be in the form of individual components or a program which produces a signal flow corresponding to the structure. A detector 7 according to the invention has a first detector element 1 and a second detector element 2. A first detector element output 3 of the first detector element 1 and a second detector element output 4 of the second detector element 2 lead to a non-exclusive OR logic link 5, which uses this to form a detector output 6 of the detector 7. Inputs of the two detector elements 1, 2 are fed through a received signal input 8 of the detector 7.

The detector 7 and the detector elements 1, 2 are designed to detect the presence of a periodic oscillation at a specific frequency in an analog signal which is applied to the received signal input 8. In order to detect signals at a number of frequencies, a corresponding number of detectors 7 are required. The principles of operation of single-tone detectors in the sense of the detector elements 1, 2 are generally known, and two of these are specified in the following text:

In a first embodiment of the invention, a single-tone detector such as this comprises a bandpass filter with a pass frequency corresponding to the signal to be detected, followed by a rectifier or detector for determining an envelope of the bandpass-filtered signal. The output of the rectifier or detector is low-pass filtered, and is compared in a comparator with a threshold value. If the amplitude of the bandpass-filtered signal is sufficient, the detection of the signal is indicated by the output of the comparator. The transmission time of the detector is equal to the inverse of the bandwidth of the bandpass filter.

In another embodiment of the invention, the received signal is correlated during a time window of constant length in a first correlator with a reference signal at the same frequency as the signal to be detected, and is correlated in a second correlator with the reference signal phase-shifted through 90°. The output signals from the two correlators are squared and are added to form a sum signal. This sum signal corresponds to a phase-independent component of the signal to be detected at the received signal, that is to say an asynchronous demodulation. The sum signal is compared in a comparator with a threshold value. If the amplitude of the sum signal is adequate, the detection of a signal is indicated by the output of the comparator. The transmission time or signal evaluation time of the detector is equal to the length of the time window of the two correlators.

Figure 4:
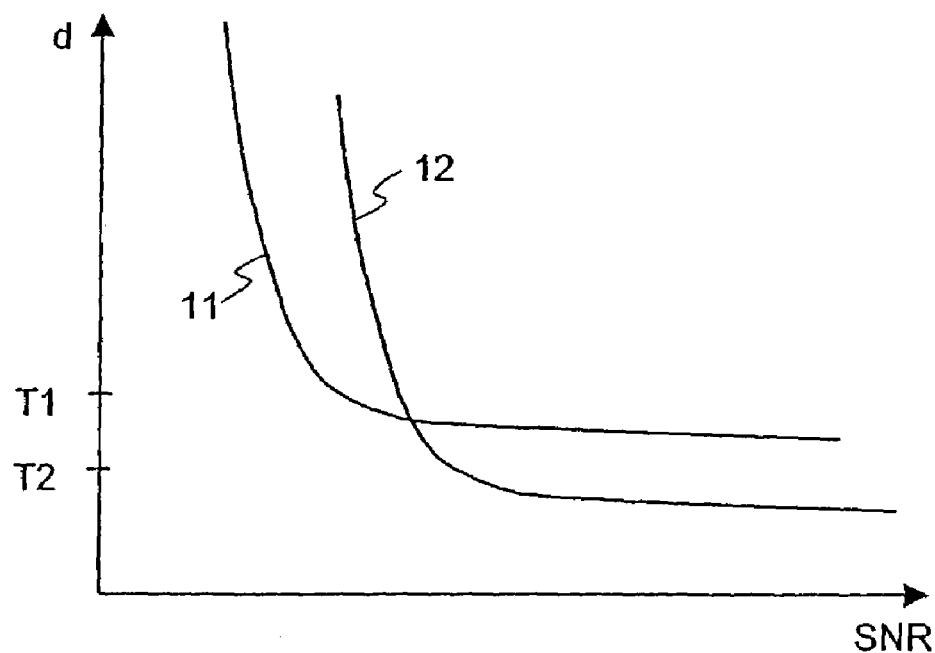
FIG. 4 shows relationships between the signal-to-noise ratio and the maximum actual transmission time for a number of detector elements which are designed for different transmission times.

The method of operation of the invention will be explained with reference to FIG. 4. FIG. 4 shows relationships between the signal-to-noise ratio and the maximum actual transmission time $T_{ac}$ for a number of detector elements which are designed for different transmission times. A first characteristic 11 shows the maximum actual transmission time $T_{ac}$ of the first detector element 1, which has a first transmission time T1. A second characteristic 12 characterizes the second detector element 2, which has a second transmission time T2. As already mentioned in the introduction, the characteristics 11, 12 are determined, for example, by measurements with the signal-to-noise ratio SNR being varied. A single characteristic can also be determined theoretically, for example as stated in "Detection, Estimation, and Modulation Theory, Part I", Harry L. van Trees, John Wiley and Sons, New York, 1968–1971, pages 246–253.

In order to allow the curves to be compared with one another, the two detector elements 1, 2 are expediently designed for the same safety and/or security value Puc. Since the safety and/or security value Puc varies, as mentioned in the introduction, as a function of the signal-to-noise ratio, the maximum value of the safety and/or security value Puc which occurs when the signal-to-noise ratio is varied is used in the following text to characterize a detector element 1, 2. This corresponds to the IEC Standard IEC60834-1, Section 2.4. In accordance with this Standard, the values of the safety and/or security value Puc should be $10^{-3}$ to $10^{-6}$ for analog transmission. However, values down to $10^{-30}$ are achievable. The reliability values should be between $10^{-2}$ and $10^{-4}$.

As can be seen from FIG. 4, one of the detector elements 1, 2 is better than the other, depending on the signal-to-noise ratio SNR. If a channel is subject to severe disturbances, that is to say the signal-to-noise ratio SNR is low, the first detector element 1 has the shorter maximum actual transmission time $T_{ac}$. For a channel which is subject to severe disturbance, that is to say when the values of the signal-to-noise ratio SNR are high, the second detector element 2 has the shorter maximum actual transmission time $T_{ac}$. Owing to the OR logic linking of the detector elements 3, 4, the detector 7 according to the invention always has the shortest possible maximum actual transmission time $T_{ac}$.

In order to allow the detector 7 to be compared with the detector elements 1, 2, it should be remembered that the safety and/or security of the detector 7 is reduced by the OR logic linking 5, which means that the probability of a signal which has not been transmitted being detected is increased. In the worst case, the safety and/or security level is halved. If there are n detector elements 1, 2, the safety and/or security level is reduced by the factor n, or the safety and/or security value Puc is increased by the factor n. In order to achieve the same safety and/or security level for the detector 7 as when using only one detector element 1, 2, the safety and/or security of the detector elements 1, 2 is increased, so that the overall safety and/or security is equal to the original safety and/or security of the detector elements 1, 2. A maximum increase to twice the safety and/or security value is required. Methods for appropriate determination of the parameters of the detector elements 1, 2 are known from detection theory.

Figure 5:
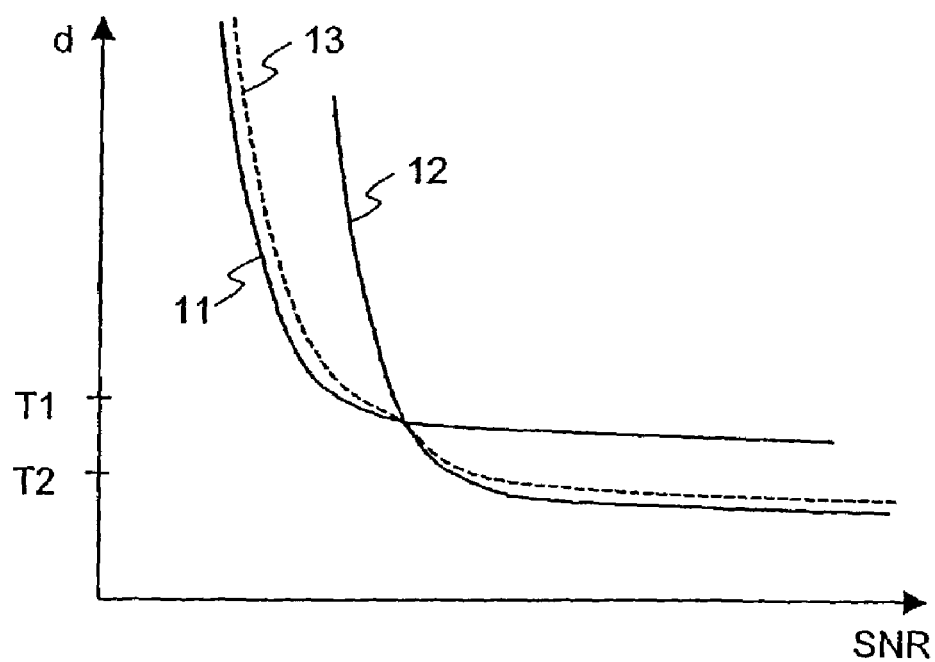
FIG. 5 shows the curves in FIG. 4, supplemented by a relationship for a detector according to the invention, which is designed for the same safety and/or security level as the detector elements.

FIG. 5 shows the curves from FIG. 4, supplemented by a relationship for a detector according to the invention, which is designed for the same safety and/or security as the detector elements. It has been found that increasing the safety and/or security results in the reliability becoming somewhat lower, or in the maximum actual transmission time $T_{ac}$, that is to say the transmission time for a predetermined reliability, rising somewhat. However, the detector 7 is always better than the two original detector elements 1, 2, which were designed for the same safety and/or security, on transmission channels for which the signal-to-noise ratio SNR can vary over a wide range in an unpredictable manner.

In one preferred embodiment of the invention, the at least two detector elements all have at least approximately the same safety and/or security. In consequence, the safety and/or security of the detector is matched as well as possible to the requirement for command transmission. If the safety and/or security of a single detector element 1, 2 were less than that of the other detector element or elements, then this would dominate the safety and/or security of the detector 7. A comparatively high safety and/or security for the other detector elements would have only a minor effect on the safety and/or security of the detector 7. Compromises with regard to other parameters of the other detector elements, which would be necessary in order to achieve their high safety and/or security level, would result in their response becoming worse, for example with respect to reliability and transmission time. This would also unnecessarily result in the response of the detector 7 becoming worse overall.

If more than two detector elements 1, 2 are used, the time constants of the number of detector elements are chosen, for example, on the basis of an arithmetic or geometric progression, and the outputs of all the detector elements are OR-linked.

Those elements of the detector 7 which provide the signal flow as shown in FIG. 3 are preferably formed by an appropriately programmed data processing unit or by application-specific integrated circuits (ASICs, FPGAs). However, they can also be formed by analog components and/or in combination with discrete logic elements and/or programmed circuits. In one preferred embodiment of the invention, the detector 7 is formed by an appropriately programmed digital signal processor.

A computer program for time-optimum reception of protection commands in a remote tripping device according to the invention can be loaded in an internal memory of a digital data processing unit and has computer program code means which, when they are configured in a digital data processing unit, cause this unit to carry out the method according to the invention. In one preferred embodiment of the invention, a computer program product has a computer-legible medium, in which the computer program code means are stored.

The use of a detector 7 according to the invention means that there is no longer any need to adjust the signal evaluation time or time constant of a detector. There is therefore also no need to make any assumptions—which are always subject to uncertainty—relating to the disturbance conditions in an intended application.

LIST OF REFERENCE SYMBOLS

1 First detector element
2 Second detector element
3 First detector element output
4 Second detector element output
5 OR logic link
6 Detector output
7 Detector
8 Received signal input
11 First characteristic
12 Second characteristic
13 Third characteristic
$T_{ac}$ Maximum actual transmission time

The invention claimed is:

1. A method for time-optimum reception of protection command signals in a remote tripping device in an electrical power transmission or distribution network, the remote tripping device, comprising:
a detector element designed for detection of a guard signal at a guard frequency, and at least two detector elements designed for detection of a protection command signal at the same frequency, different from the guard frequency, but with different transmission times, and
wherein the protection command signal is regarded as having been detected when at least one of these detector elements detects the presence of the protection command signal and when, concurrently, no said guard signal is detected.

2. The method as claimed in claim 1, wherein the at least two detector elements are designed for the same safety and/or security values Puc.

3. A remote tripping device having a detector for time-optimum reception of a protection command signal in an electrical power distribution network, wherein the protection command signal is a safety and/or security signal Puc having a value different from a guard signal, wherein the detector comprises:

at least two detector elements, which are all designed for detecting a protection command signal at the same frequency but for different transmission times, and has non-exclusive OR logic linking of detector element outputs of the at least two detector elements in order to form an output of the detector, wherein the protection command signal is a safety and/or security signal Puc.

4. The remote tripping device as claimed in claim 3, wherein the at least two detector elements are designed for the same safety and/or security values Puc.

* * * * *